United States Patent
Gruber

[19]

[11] Patent Number: 6,073,573
[45] Date of Patent: Jun. 13, 2000

[54] FLOATING MULTI-UNIT DWELLING

[76] Inventor: Matthew Gruber, 490 Miller St., SE., Salem, Oreg. 97302

[21] Appl. No.: 09/160,453

[22] Filed: Sep. 24, 1998

[51] Int. Cl.$^7$ ............................................ B63B 35/44
[52] U.S. Cl. ............................................ 114/264
[58] Field of Search .................. 114/258, 263, 114/264, 267; 52/79.2

[56] References Cited

U.S. PATENT DOCUMENTS

| | | |
|---|---|---|
| 1,016,808 | 2/1912 | Williamson . |
| 1,088,239 | 2/1914 | Paine . |
| 1,511,153 | 10/1924 | Armstrong . |
| 1,861,338 | 5/1932 | Fau . |
| 2,374,938 | 5/1945 | Hundley . |
| 2,408,871 | 10/1946 | Nelson . |
| 3,708,991 | 1/1973 | Barkley . |
| 3,977,344 | 8/1976 | Holford . |
| 3,978,805 | 9/1976 | Thomas . |
| 4,059,065 | 11/1977 | Clark . |
| 4,087,980 | 5/1978 | Kono . |
| 4,186,532 | 2/1980 | Kahn . |
| 4,286,538 | 9/1981 | Matsui . |
| 4,299,066 | 11/1981 | Thompson . |
| 4,406,243 | 9/1983 | Kim . |
| 4,502,551 | 3/1985 | Rule . |
| 4,556,002 | 12/1985 | Georgii . |
| 4,565,149 | 1/1986 | Clasky . |
| 4,565,150 | 1/1986 | Liden . |
| 4,640,214 | 2/1987 | Bruns . |
| 4,726,316 | 2/1988 | Bruns . |
| 4,799,828 | 1/1989 | Georgii . |
| 4,837,989 | 6/1989 | Levy . |
| 4,904,118 | 2/1990 | Thiemann . |
| 4,984,935 | 1/1991 | de Oliveira Filho . |
| 4,993,347 | 2/1991 | Fiiho . |
| 5,049,004 | 9/1991 | Niimura . |
| 5,125,769 | 6/1992 | Lee . |
| 5,189,978 | 3/1993 | McAllister . |
| 5,347,944 | 9/1994 | Dupre'. |
| 5,421,282 | 6/1995 | Morris . |
| 5,524,549 | 6/1996 | Morris . |

*Primary Examiner*—Jesus D. Sotelo
*Attorney, Agent, or Firm*—Robert L. Harrington

[57] ABSTRACT

A floating habitat arranged to be anchored at a permanent location on a body of water such as an ocean. The habitat has a pyramid like upper section that is supported on a lower pyramid like section. Columns extended between the lower and upper sections supports the upper section above the wave line. The lower section is anchored to the ocean floor. A ballast chamber and additional ballast weights are provided for stabilization control. Docks are provided along the sides of the upper section to accommodate water craft.

6 Claims, 1 Drawing Sheet

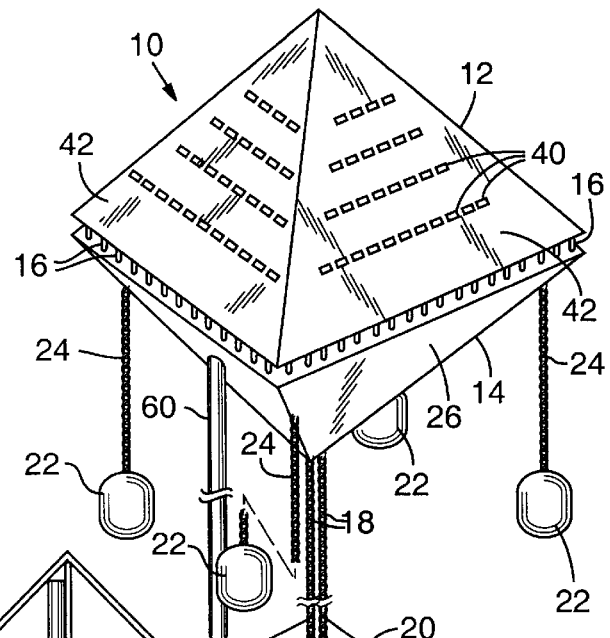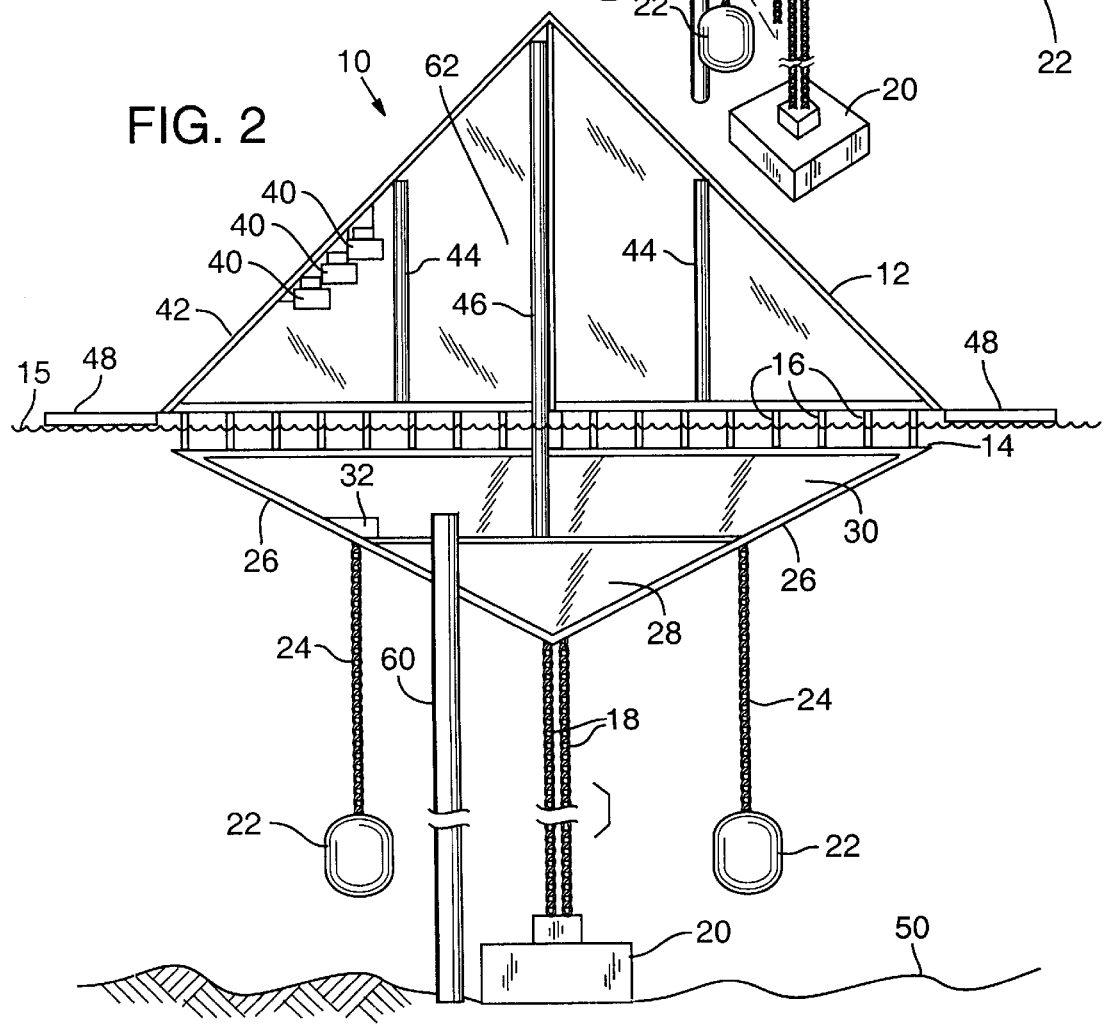

FLOATING MULTI-UNIT DWELLING

FIELD OF THE INVENTION

This invention relates to a floating structure that is situated off shore, e.g., from a high density coastal city and provides all the elements of a bedroom community (e.g., 5000 population), and is designed to provide the stability, safety and life style of a modern suburban community.

BACKGROUND OF THE INVENTION

Technology exists for building huge ships, stationary off shore drilling rigs and even off shore dwellings. Patents have been issued on all of these structures but no one known to applicant has conceived of building a structure to suitably house an entire community. Many advantages exist for such a structure. The sheer size of such a structure offers the opportunity to include efficient and economical recreational facilities, community transportation to and from shore, sewer and water treatment facilities making it fully self contained and un-paralleled scenic living quarters with the opportunity to commute to jobs in a large coastal city all of which far surpasses the commuting difficulties of land transportation to typical bedroom communities, e.g., in San Francisco, Los Angeles, Seattle etc.,

BRIEF DESCRIPTION OF THE INVENTION

Stability is a primary consideration. The floating structure of the preferred embodiment is designed to have an above water pyramidal or conical (such terms encompassing frusto pyramidal or frusto conical) shape that has a width to height relationship (the width being measured at the water line) of about 2 to 1, e.g., an 800 foot width and a 400 foot height. The structure below the water is preferably also pyramidal or conical but in reverse, i.e., narrowing from the base dimension at the waterline to a depth of about 200 feet (half the height that the structure projects above the water).

Preferably the super-structure(above the water) and the sub-structure (below the water) are connected via spaced cylindrical pipes or posts, e.g., two feet in diameter by 20 feet in vertical height, which projects the super-structure over the water and provides for wave movement through the structure (beneath the super-structure and above the sub-structure).

The sub-structure provides the space for such utilities as power plant, water desalination, sewage treatment and all the many maintenance service facilities. The hollow pipes carry the many transmission conduits, and elevator shafts extend substantially from near the top of the super-structure to the bottom of the sub-structure (or as needed to service the various equipment therein). Floating the structure is not a problem as the technology of floatation has been adequately developed to satisfy this purpose. Stabilization is enhanced by weights extended from ballast chains at positions spaced around a vertical axis passing down through the center of the structure. From the bottom of the sub-structure and at its center axis, an anchor and chain secures the structure to the floor or bottom of the water body, e.g., to a depth 400 feet below the waterline. Provisions can be made (and would likely be made) for adjusting the weights suspended from the ballast chains, e.g., water can be pumped into and out of hollow containers suspended from the chain as dictated by a computer that senses conditions of destabilization.

There are many features that are applicable to the floating structure of the present invention which will be more fully appreciated upon reference to the detailed description and the drawings that are referred to therein. To a substantial degree the invention is a compilation of known technologies to enable a unique floating structure that can be characterized as a floating city with most or all the benefits a city offers without many of the disadvantages of conventional bedroom communities surrounding a major city.

BRIEF DESCRIPTION OF THE DRAWINGS

FIG. 1 is a perspective view of a floating habitat in accordance with the invention; and FIG. 2 is a sectional view of the habitat of FIG. 1.

DESCRIPTION OF THE PREFERRED EMBODIMENT

Refer now to FIG. 1 of the drawings which illustrates one embodiment of a floating habitat 10. The habitat 10 is arranged to be situated at an off shore site on a body of water such as on ocean or sea.

In this embodiment, the habitat 10 has a structure referred to as a super-structure 12 that is supported on a buoyant sub-structure 14. The super-structure 12 is preferably supported on multiple columns 16 that extend between the super-structure 12 and the sub-structure 14. The sub-structure 14 has sufficient buoyancy to elevate the super-structure 12 off of the water line 15.

It is contemplated that the sub-structure 14 would be fabricated near shore and towed to the desired site on the ocean. The sub-structure 14 is anchored to the ocean floor as illustrated by an anchor 20. The anchor system for the structure will, however, be more complex, e.g., to prevent turning. Such anchoring systems are known and further detail will not be provided. The super-structure 12 would then be erected on the sub-structure 14.

The super-structure 12 is not subject to the action of the waves on the body of water. Only the columns 16 extending between the super-structure 12 and the sub-structure 14 will be subject to the wave action.

The sub-structure 14 is anchored to the ocean bottom 50 on an anchor 20. Fastening members 18 such as chain or cables connected to the center of the sub-structure 14 and extended to the anchor 20 secures the habitat in position. The anchor chain 20 is connected to the lower most portion of the sub-structure 14 which places the anchor position substantially at the vertical center axis of the habitat 10.

The habitat is further stabilized by multiple ballasts 22. The ballasts 22 are suspended from fasteners 24 such as chains. The ballasts 22 are positioned at a distance from the center anchoring point (anchor 20) and are provided at spaced intervals on the base walls 26 of the sub-structure 14.

The ballasts 22 are preferably of the type wherein the weight of ballast 22 may be varied. One manner of varying the weight is the addition or removal of water from the ballast 22. The downward force exerted by the ballasts 22 may thus be varied.

A ballast tank 28 is also provided in the sub-structure 14. Fresh or salt water is added or removed as required to adjust the buoyancy of the sub-structure 14.

A computer and control center 32 housed in a control room of the upper portion 30 of the sub-structure 14 controls the addition and removal of water from the ballast tank 28. The computer and control center 32 also controls the addition and removal of water from the ballasts 22. The center 32 by controlling the ballast units controls the stability of the habitat 10.

The upper portion 30 of the sub-structure is utilized for support equipment for the habitat 10. The upper portion 30 may include, for example, a water desalination plant, a waste disposal plant, a control room, a maintenance department and other support equipment.

At least some of the inter-connecting columns 16 are hollow. The hollow columns 16 provide a conduit for services such as power, fresh and waste water plumbing, communication devices and air conditioning equipment to name a few. Also, they may hold liquid or air as desired for buoyancy or alternatively or in part provide storage space, etc.

The habitat 10 has many and varied uses. In this example, the habitat 10 is arranged for human habitation and incorporates all the amenities of a land based community. The habitat 10 has multiple dwelling units 40 such as apartments. Only a few of the apartments 40 in the example are illustrated. They are not to scale but are shown as one example of apartments with exposure to the exterior walls 42 to provide a scenic view. It will be appreciated that the arrangement and the positioning of the apartments will be according to the design criteria. Elevators 44 are provided in the super-structure 12 to provide access to the different levels. The number of elevators 44 and their position within the super-structure 12 is determined by the layout design of the interior of the super-structure 12. At least one elevator 46 is provided to provide access between the super-structure 12 and the sub-structure 14.

The center portion 62 of the super-structure 12 provides an area for the usual community shops and service facilities such as stores, hospital, security services, restaurants, recreation facilities and the like.

Docks 48 (not shown in FIG. 1) are provided along the sides of the super-structure 12 to accommodate boats, barges, ferries and the like. Residential docking may be provided inside the structure, i.e., in the spacing established by the columns 16.

The habitat may also have a shaft 60 that extends from the sub-structure 14 to the ocean floor 50 to facilitate mining operations.

Those skilled in the art will recognize that modifications and variations may be made without departing from the true spirit and scope of the invention. The invention is therefore not to be limited to the embodiments described and illustrated but is to be determined from the appended claims.

What is claimed is:

1. A floating multi-unit structure for residential, recreational and/or office use designed for floating on a large body of water defining a waterline, with the structure permanently anchored at an off shore location, comprising:

a super-structure and a sub-structure, said super-structure having a lateral cross sectional dimension adjacent the waterline of a determined dimension and narrowing in dimension as it elevates above the water to provide a diminishing and inwardly angled exterior face that is polygonal in cross sectional configuration and extends in height to no greater than about half the lateral dimension at the waterline, and dwelling units provided in the super-structure at different levels above the waterline;

a sub-structure below the waterline and floatably supporting the super-structure, said sub-structure containing service facilities for the dwelling units and adjustable stabilization apparatus to counter destabilizing conditions common to a floating structure residing on a large body of water, and an anchor for permanently affixing the position of the structure; and supporting columns functioning as spacers between the super-structure and sub-structure which permit wave action and water flow to pass between the super-structure and sub-structure.

2. A floating multi-unit structure as defined in claim 1 wherein the super structure, is designed for total utilization wherein the exterior is fitted with modular residential living units and the interior of the structure is provided with common recreational facilities.

3. A floating multi-unit structure as defined in claim 1 wherein the sub-structure extends below the waterline to at least half the distance of the super structure above the waterline and at that depth being provided with a centered weight for stabilization.

4. A floating multi-unit structure as defined in claim 3 wherein the sub-structure includes a base dimension sufficient to substantially underlie the super structure at the waterline, said sub-structure narrowing in cross section dimension as it descends into the water.

5. A floating multi-unit structure for residential or office use designed for floating on a large body of water defining a waterline, with the structure permanently anchored at an off shore location, comprising:

a super-structure and a sub-structure, said super-structure having a lateral cross sectional dimension adjacent the waterline of a determined dimension and narrowing in dimension as it elevates above the water to provide a diminishing and inwardly angled face, units provided in the super structure at different levels above the waterline;

a sub-structure below the waterline and extending below the waterline to at least half the distance of the super structure above the waterline and at said depth being provided with a centered weight for stabilization, said sub-structure floatably supporting the super-structure, said sub-structure having adjustable stabilization apparatus to counter destabilizing conditions common to a floating structure residing on a large body of water, and an anchor for permanently affixing the position of the structure.

6. A floating multi-unit residential structure designed for floating on a large body of water defining a waterline, with the structure permanently anchored at an off shore location, comprising:

a super-structure and a sub-structure, said super-structure having a lateral cross sectional dimension adjacent the waterline of a determined dimension providing a base and narrowing in dimension as it elevates above the water to provide a diminishing and inwardly angled face, and dwelling units provided in the super-structure at different levels above the waterline;

a sub-structure including a sub-structure base at the waterline dimensioned to substantially underlie the base of the super structure and narrowing in dimension as it descends into the water to a depth at least half the distance of the super structure height for floatably supporting the super-structure, said sub-structure containing service facilities for the dwelling units, and a stabilizing weight in the bottom-most portion of the sub-structure and adjustable stabilization apparatus to counter destabilizing conditions common to a floating structure residing on a large body of water, and an anchor for permanently affixing the position of the structure.

* * * * *